Figure 1:
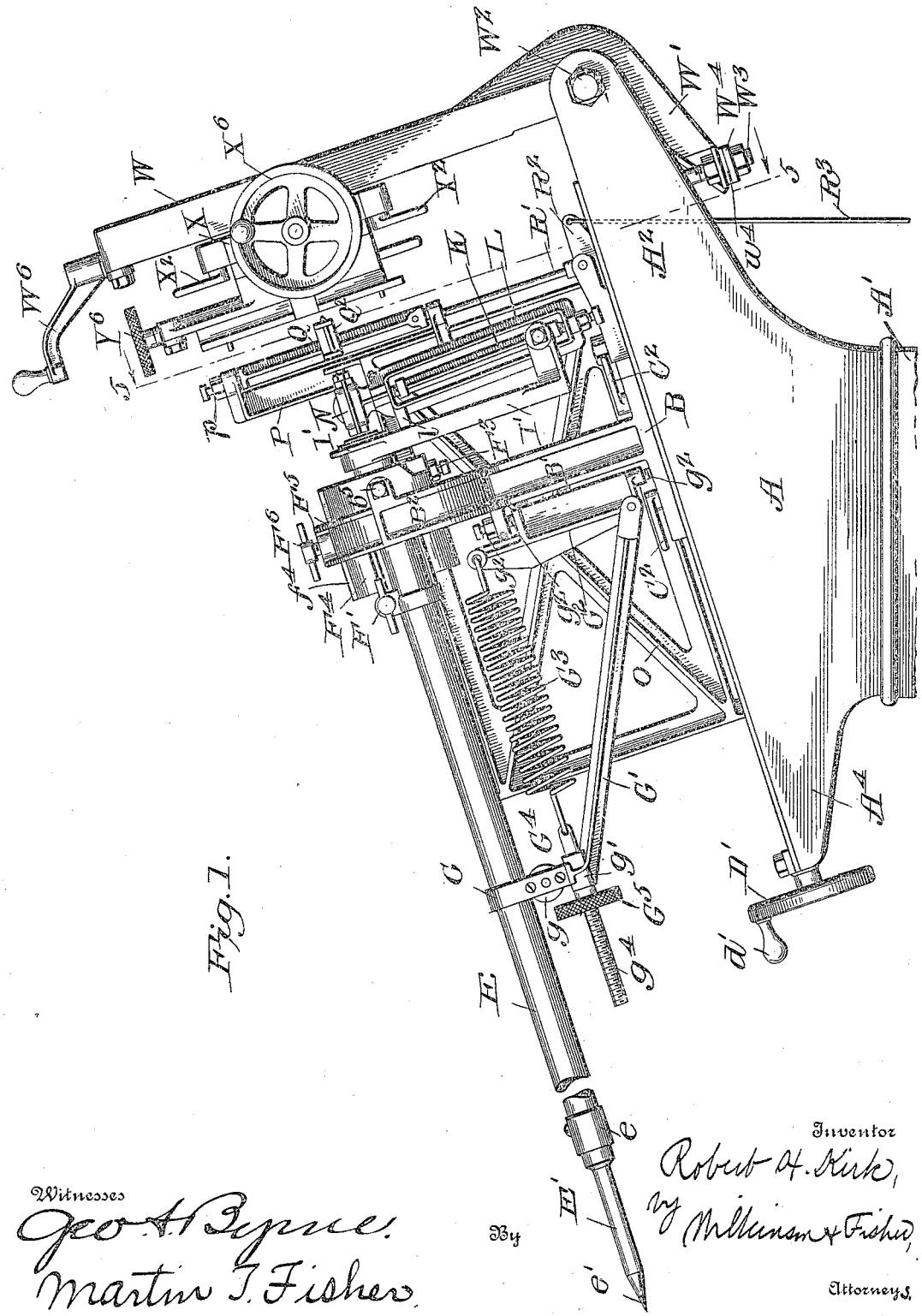

R. H. KIRK.
ENGRAVING MACHINE.
APPLICATION FILED MAY 25, 1906.

962,439.

Patented June 28, 1910.
8 SHEETS—SHEET 1.

Witnesses
Geo. H. Byrne.
Martin T. Fisher.

Inventor
Robert H. Kirk,
By Wilkinson & Fisher,
Attorneys.

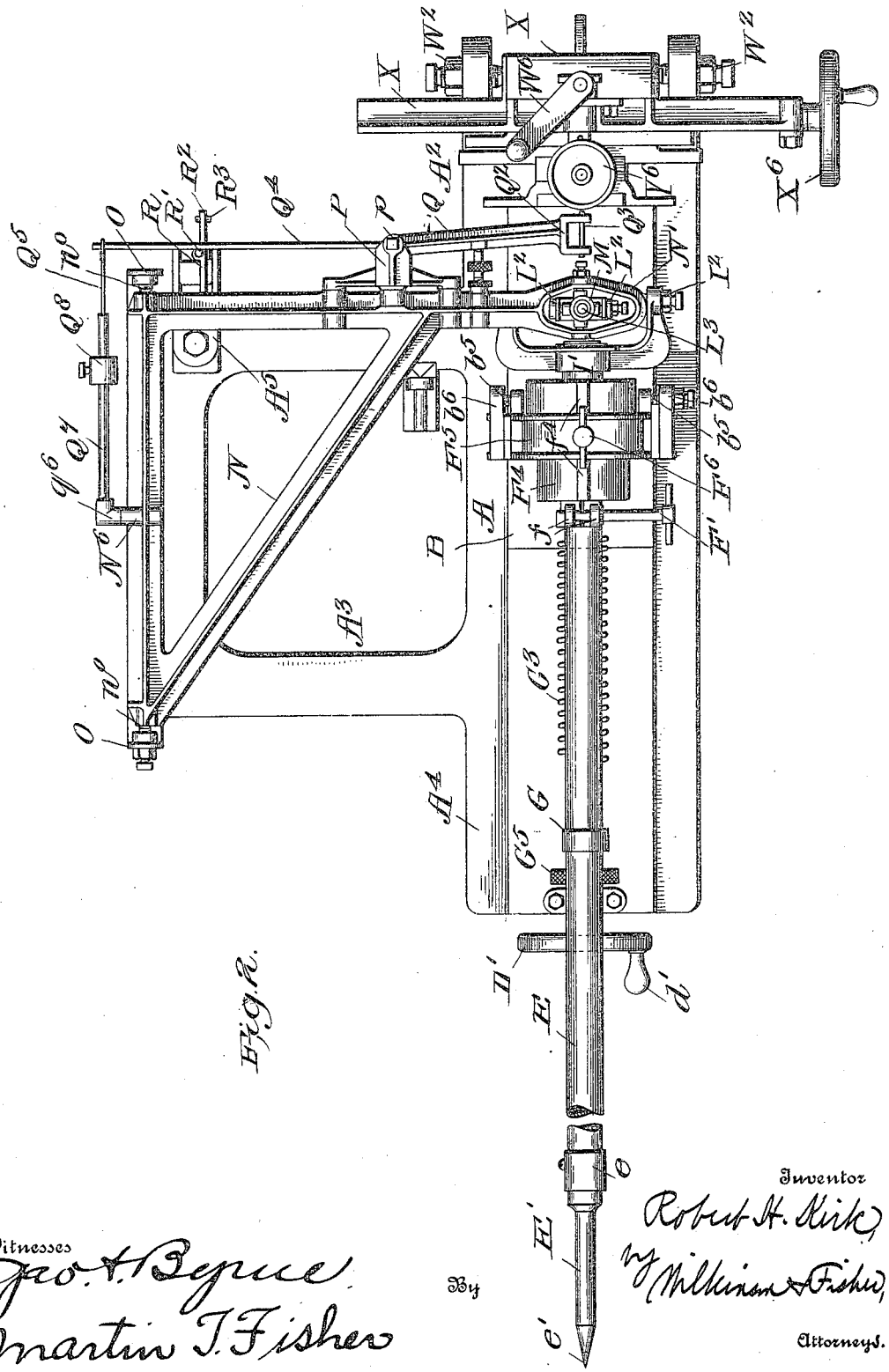

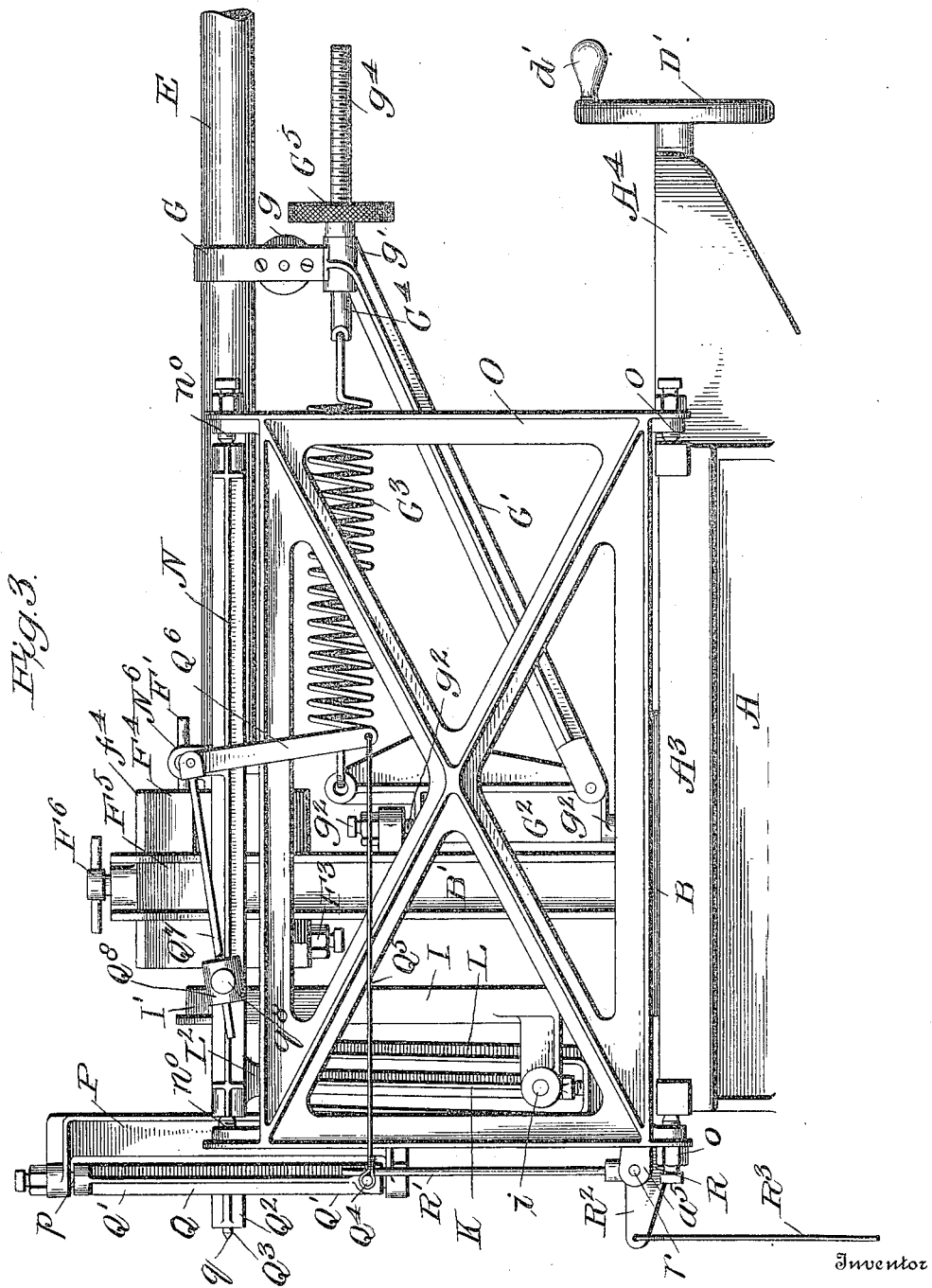

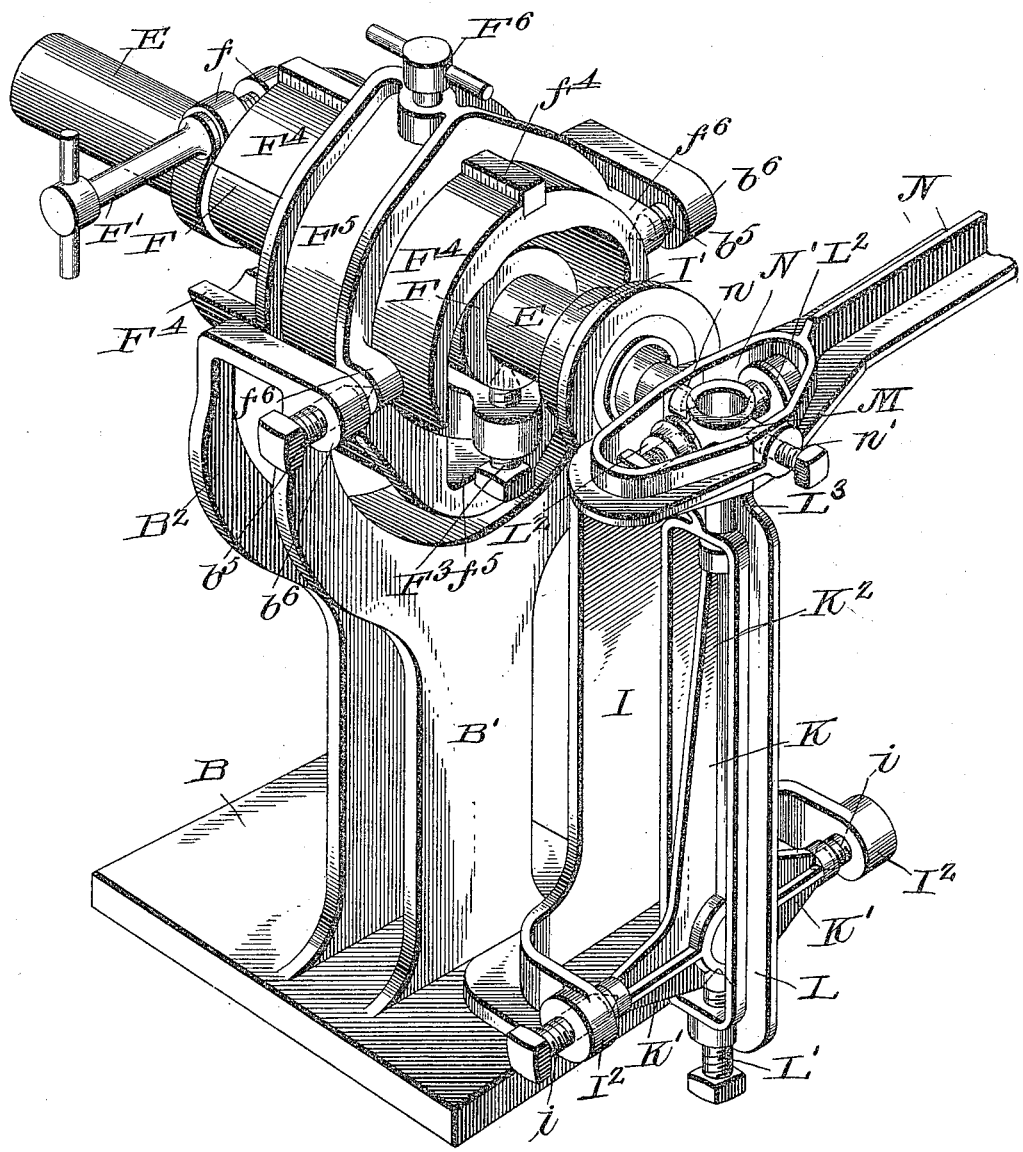

R. H. KIRK.
ENGRAVING MACHINE.
APPLICATION FILED MAY 25, 1906.
962,439.
Patented June 28, 1910.
8 SHEETS—SHEET 5.
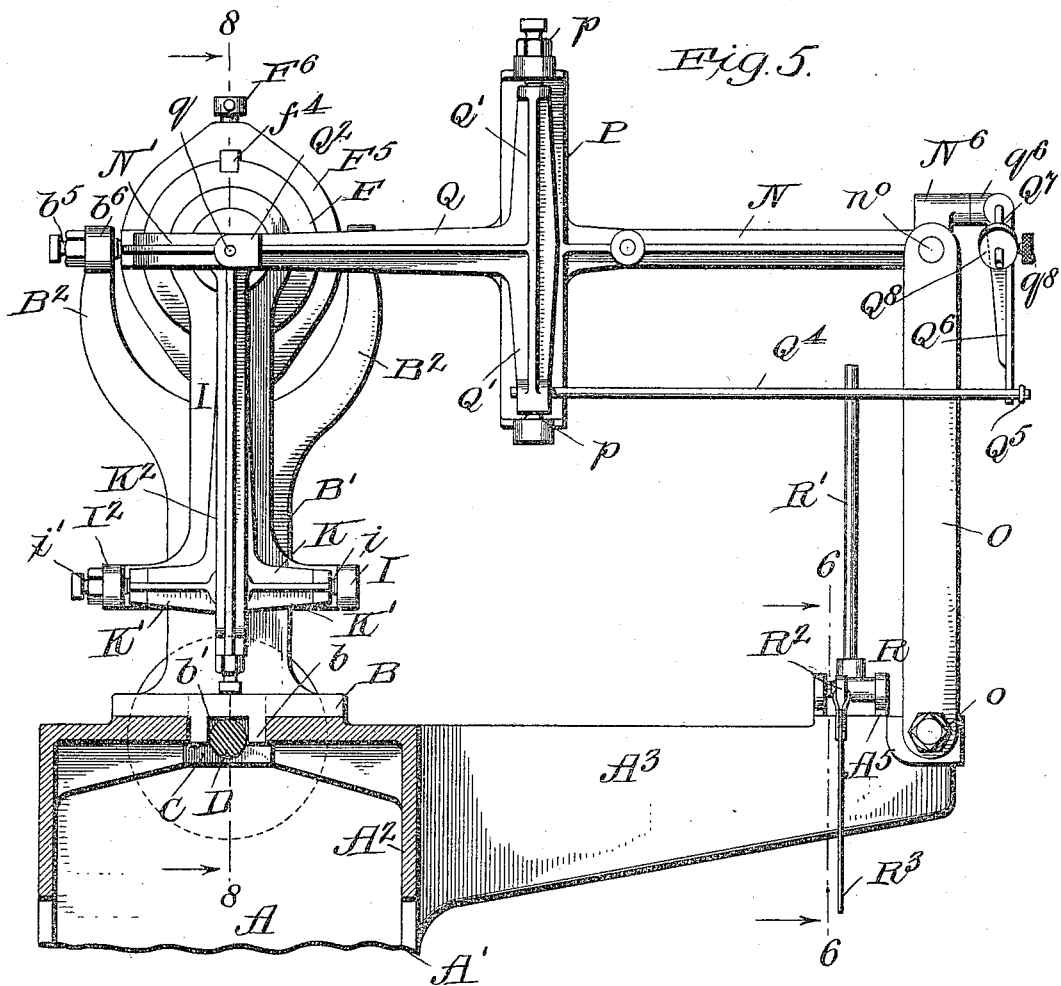
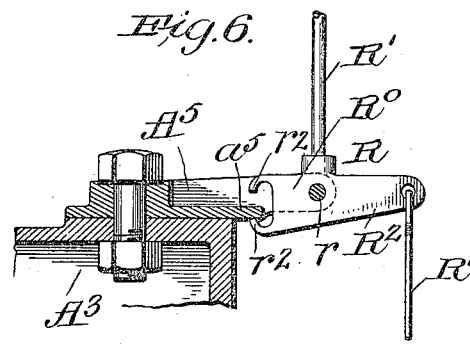
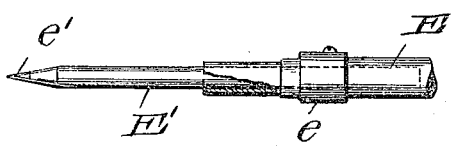

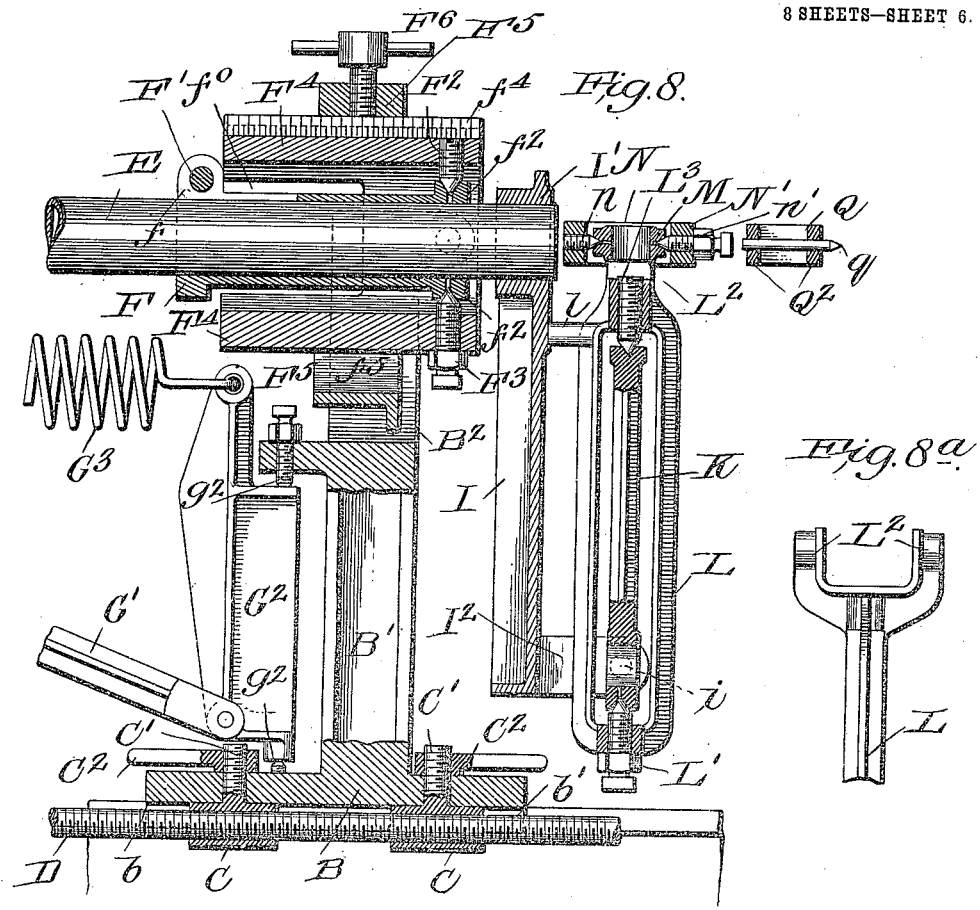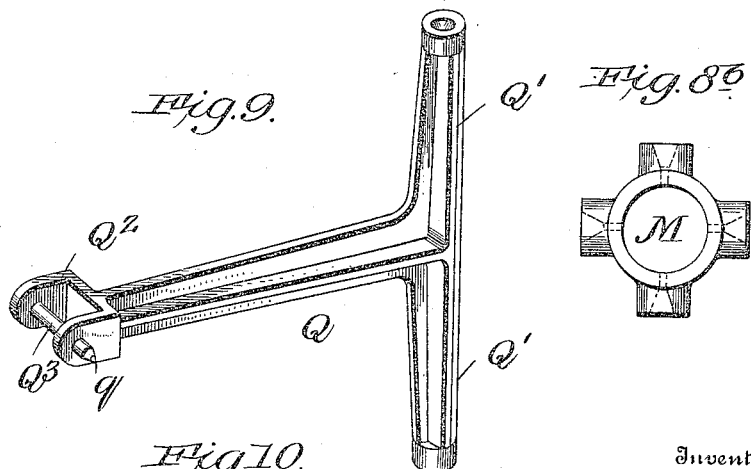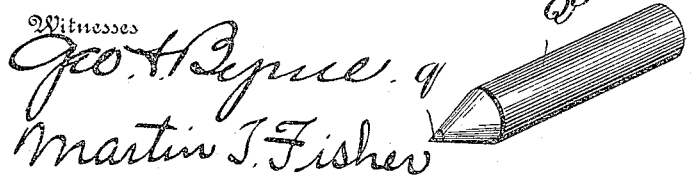

R. H. KIRK.
ENGRAVING MACHINE.
APPLICATION FILED MAY 25, 1906.
962,439.
Patented June 28, 1910.
8 SHEETS—SHEET 7.
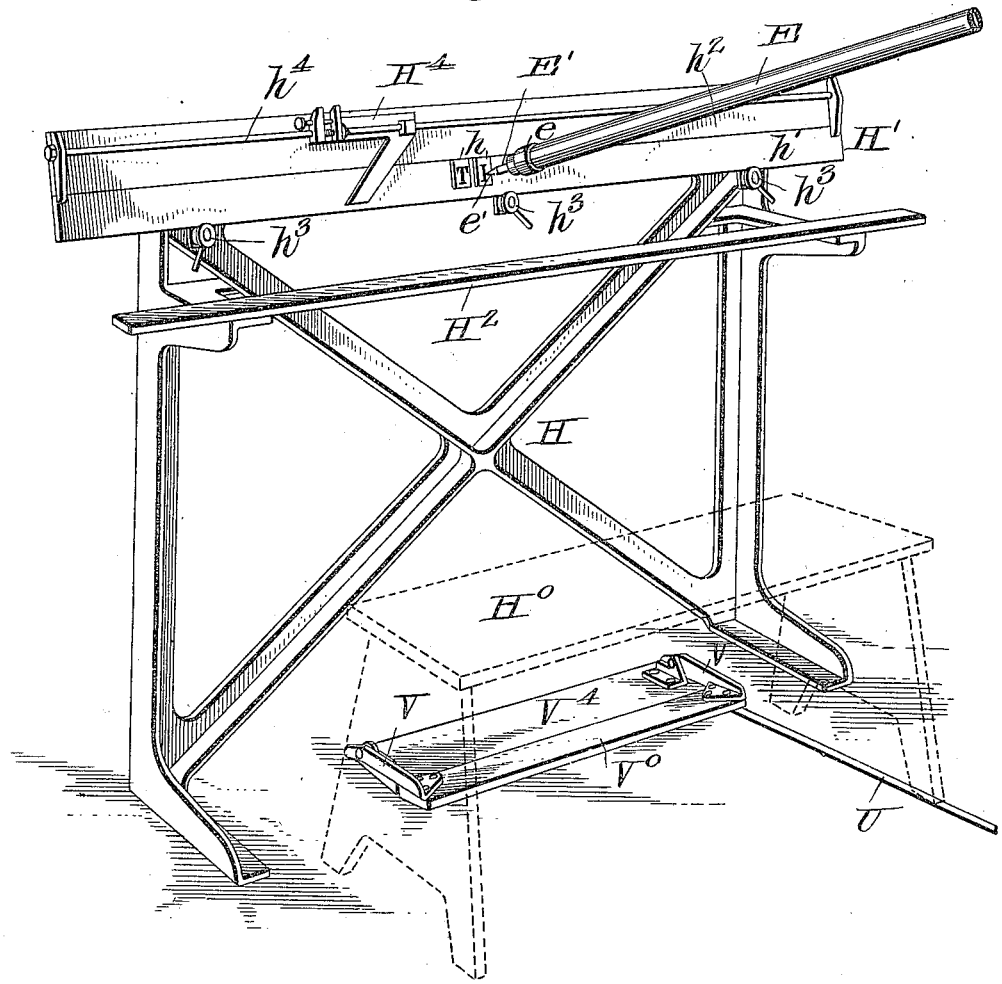
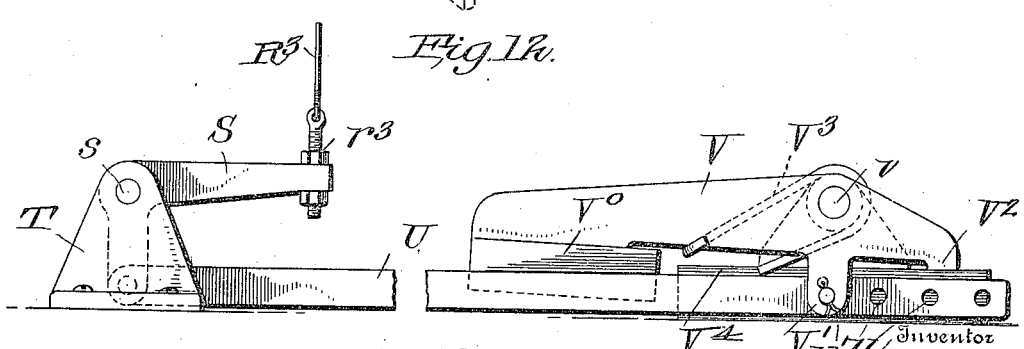
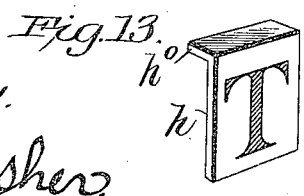

R. H. KIRK.
ENGRAVING MACHINE.
APPLICATION FILED MAY 25, 1906.
962,439.
Patented June 28, 1910.
8 SHEETS—SHEET 8.
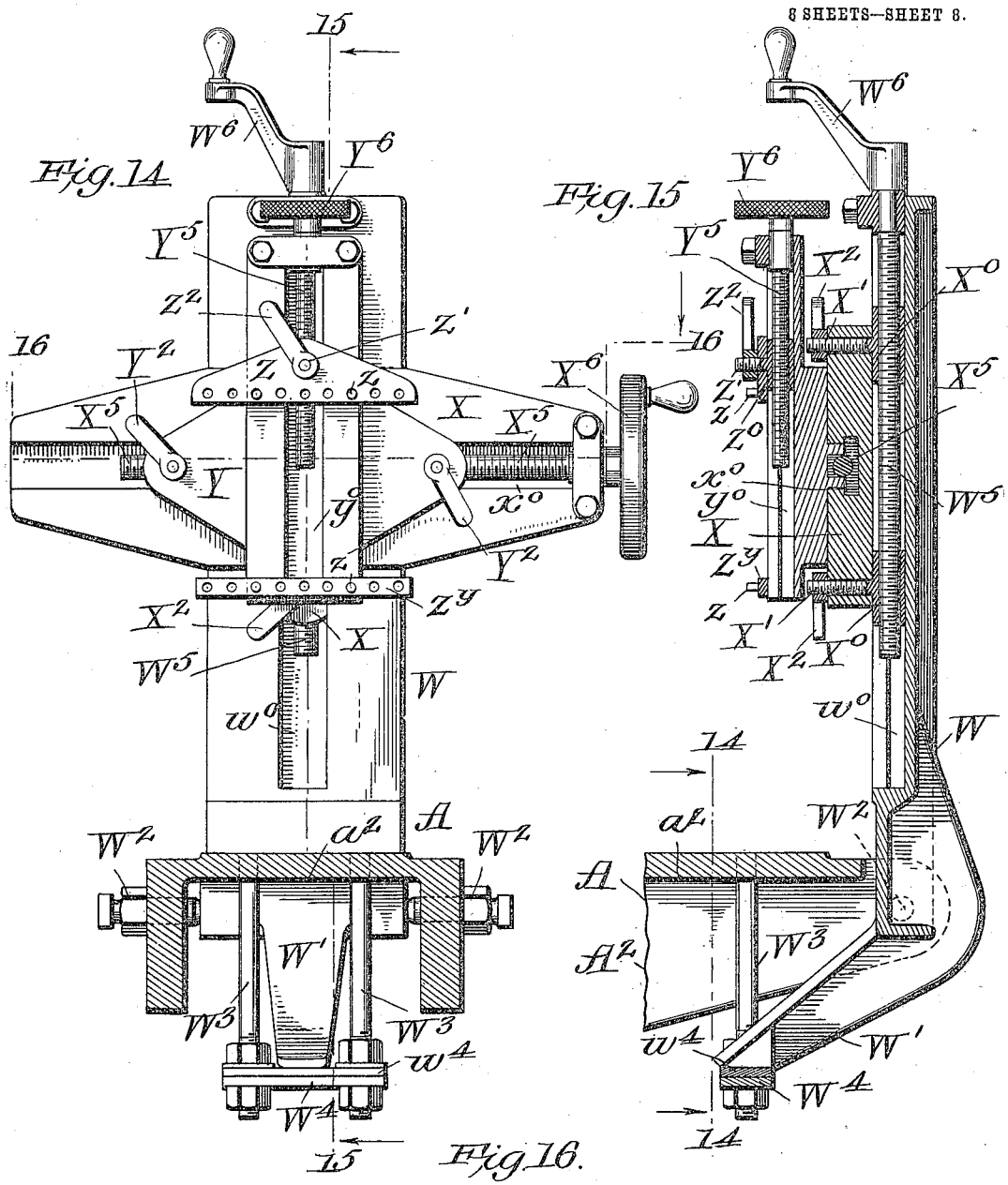
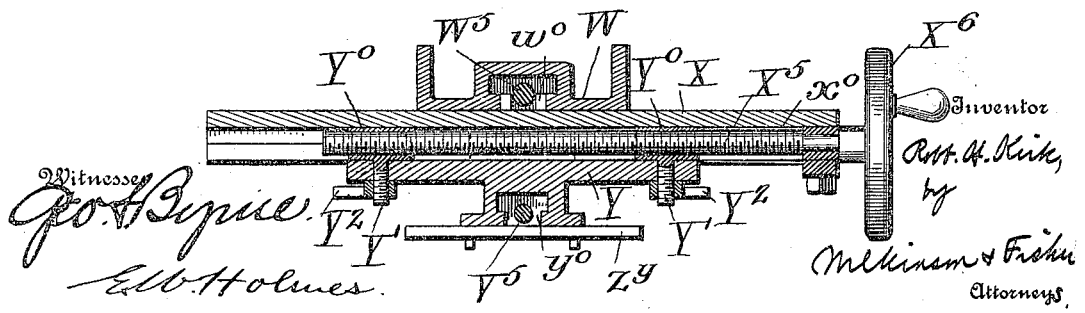

UNITED STATES PATENT OFFICE.

ROBERT H. KIRK, OF CLEVELAND, OHIO, ASSIGNOR TO THE "LONG-ARM" SYSTEM COMPANY, OF CLEVELAND, OHIO, A CORPORATION OF OHIO.

ENGRAVING-MACHINE.

962,439.  Specification of Letters Patent.  Patented June 28, 1910.

Application filed May 25, 1906. Serial No. 318,735.

*To all whom it may concern:*

Be it known that I, ROBERT H. KIRK, a citizen of the United States, residing at Cleveland, in the county of Cuyahoga and State of Ohio, have invented certain new and useful Improvements in Engraving-Machines; and I do hereby declare the following to be a full, clear, and exact description of the invention, such as will enable others skilled in the art to which it appertains to make and use the same.

This invention relates to improvements in engraving machines in which it is desired to engrave in intaglio on the plate, letters or other characters or designs, and in which the character or design is reproduced with or without predetermined variations.

This invention is particularly intended to provide an engraving machine which will engrave copper plates for use in printing cards, invitations, or high grade stationery, or for tracing designs upon steel or other plates.

According to this invention, the letters or other characters may be reproduced in different dimensions, and the letters or other characters may be made fat or lean, or otherwise varied in size, as will be hereinafter described.

According to this invention, the operator follows the design to be reproduced with a tracer tool, sitting with his back to the plate, while at the other end of the instrument, the graver reproduces on the plate the design or letters on the desired scale, generally greatly reduced in size, and with or without distortion, as will be hereinafter described.

The instrument comprises in brief a tracer rod which may be moved by the operator, and having a tracer point at one end to follow the design or type, while at its opposite end it operates a graver. This graver is not directly connected to the tracer rod, but it is caused to follow the motions of the tracer rod by mechanism operated by the said motion of the tracer rod, as will be hereinafter described.

The machine is carried by a mount, preferably inclined at an angle downward, so that the tracer rod may pass down over the shoulder of the operator, and the said mount carries a plate holder in which the plate may be accurately adjusted.

Figure 1 is a side elevation of the machine showing the upper portion of its mount or pedestal only. Fig. 2 is a plan view of the machine, showing the top of the mount. Fig. 3 is a side elevation on an enlarged scale seen from the opposite side of that shown in Fig. 1. Fig. 4 is a perspective view on an enlarged scale, showing the rear end of the tracer rod and the parts contiguous thereto, but omitting the graver. Fig. 5 shows a section along the line 5—5 of Fig. 1 and looking in the direction of the arrows. Fig. 6 shows a section on an enlarged scale, taken along the line 6—6 of Fig. 5, and looking in the direction of the arrows. Fig. 7 is a detail showing the end of the tracer rod with the tracer tool mounted therein. Fig. 8 shows a section along the line 8—8 of Fig. 5, looking in the direction of the arrows. Fig. 8$^a$ is a detail showing the head of the link as seen from the left of Fig. 8, and Fig. 8$^b$ is a detail on a larger scale, showing a plan view of the cross of Fig. 8. Fig. 9 is a detail showing the graver holder with the graver mounted therein. Fig. 10 is a detail showing the graver detached from its holder, and on an enlarged scale. Fig. 11 shows a holder for the type or other design to be reproduced, with the apparatus at the operator's end of the machine. Fig. 12 shows the treadle and its connections for throwing the graver out of operation. Fig. 13 is a perspective view of one form of type or pattern to be reproduced. Fig. 14 shows a front elevation of the plate holder, with a section of the mount, along the line 5—5 Fig. 1 looking to the right, or along the line 14—14 of Fig. 15 looking in the direction of the arrows. Fig. 15 shows a section along the line 15—15 of Fig. 14, looking in the direction of the arrows, and Fig. 16 shows a section along the broken line 16—16 of Fig. 14, and looking down.

A represents a mount which consists of a suitable frame or bed, preferably a metal casting, carried by a pedestal A′, and having arms A$^2$, A$^3$ and A$^4$.

B represents a plate mounted on the top of the mount A, and provided with an upright B′ carrying a yoke B$^2$ in which the tracer rod is mounted, as will be hereinafter described. This bed plate B is provided with a guide lug $b$ which projects into a longitudinal slot in the top of the mount, as shown in Fig. 5. This guide lug is provided with a longitudinal groove $b'$ in which are mounted the nuts C, provided with screw-threaded shanks C' and clamps C², as shown in Fig. 8. The screw D engages these nuts C, and is revolubly mounted in the bed A, and this screw is turned by means of a hand wheel D', preferably provided with a handle d' for quick adjustment. By turning this screw D, the yoke B² may be moved longitudinally along the bed A, and thus the tracer rod and the parts carried thereby may be moved in either direction.

E represents the traced rod, which is preferably made hollow and carries a tracer tool E', telescopically mounted therein, as shown in Fig. 7, connected to the rod in any convenient way, as at e, and this tracer tool is provided with a tracer point e'. This rod is mounted in a sleeve F, which is provided with ears f, and is clamped in any desired position on said rod by means of the clamp screw F', as shown most clearly in Figs. 4 and 8. This sleeve is provided with bearings $f^2$ to engage the pivots F² and F³. There are a number of these bearings similar to those just described in the machine, and for convenience of adjustment, one or both of these screws may have lock nuts, such as are shown on the screw F³ in Fig. 8. The screws F² and F³ are adjustably mounted in the sleeve F⁴, which is slotted as at $f^0$ and carries a feather $f^4$ which engages in a longitudinal slot in the ring F⁵, as shown most clearly in Fig. 4. This ring F⁵ is provided with ears $f^6$ having bearings to engage the screw pivots $b^5$, adjustably mounted in the ears $b^6$ of the yoke B². The feather $f^4$ is provided with suitable graduations, so that the sleeve F⁴ may be adjusted at the desired position relative to the ring F⁵, and may be clamped at this position by means of the clamp screw F⁶. It will thus be seen that the tracer rod may be swung laterally about the pivots F² and F³, and may be swung vertically about the pivots $b^5$, and is therefore mounted in gimbals, and therefore has universal motion in the yoke B². Moreover, the yoke may be moved bodily by means of the screw D, carrying with it the tracer rod and connected parts; or by easing up on the clamp F' and holding the tracer rod fast, the gimbals may be moved backward or forward relative to the tracer rod, thus increasing or decreasing the size of the reproduction. Moreover, by moving the sleeve F⁴ relative to the ring F⁵, or moving the sleeve F relative to the rod E, the reproduction may be made within limits wider or narrower vertically or horizontally, thus causing letters or the like to be reproduced short or tall or fat or lean, as may be desired.

The operator sits on a bench H⁰, see Fig. 11, facing the type holder H', which is mounted on a suitable frame H, which for convenience is preferably provided with a wrist bar H² to support the wrist of the operator. This type holder is shown as composed of a fixed board or plate $h^2$, and a movable board or plate h', which is held in place by the adjustable clamps $h^3$, the type or characters h having a lug $h^0$, as shown in Fig. 13, to be clamped between two boards h' and $h^2$, but any convenient form of type holder may be adopted.

For convenience in line shading, a suitable liner H⁴ is provided, mounted on the rod $h^4$, but this is not part of my present invention.

For convenience in operating the machine, the tracer rod E is inclined upward, passing over the shoulder of the operator, which is the reason for mounting the machine at an angle as indicated in Figs. 1 and 11.

Since the tracer rod E is very long, and is pivoted near one end, some means for balancing the weight of the rod is desirable, and for this purpose I provide a sliding link G, carrying the roller g (see Figs. 1 and 3), the weight of the rod resting on this roller. This link G is carried by an arm G', pivoted to the bar G², which is itself trunnioned as at $g^2$, $g^2$ to swing laterally. Fast to this bar is one end of the spring G³, which is under tension, and the other end of this spring is secured to the rod G⁴, which is screw-threaded as at $g^4$ and passes through the sleeve g'. The thumb nut G⁵ is mounted on the screw-thread $g^4$, and the tension of the spring can be adjusted, so that it will balance or nearly balance the weight of the rod E, and at the same time permit the rod to be moved up or down, and to swing laterally. In short, this balancing arrangement does not interfere with the universal motion required for the tracer rod.

The plate end of the tracer rod E carries a set collar I', see Figs. 4 and 8, integral with the dependent arm I, carrying the yoke I², provided with the screws i in which the arms K' of the tee K are swiveled as shown in Fig. 4. This tee K engages the screw bearings L' and $L^3$ carried by the link L. The link terminates in the yoke L², see Figs. 2, 4, and 8, in which is trunnioned the cross M. This cross rocks on two axes at right angles to each other, one axis comprising swivel screws carried by the yoke L² at the head of the link L, and the other axis comprising swivel screws n and n' carried in the eye N' of the frame N, as shown in Figs. 4 and 8. The link L is provided with a stop l to keep the frame N clear of engagement with the rod E (see Fig. 8). This frame N is generally triangular in form, and rocks on the pivots $n^0$ of the pivoted frame O, which frame rocks on the pivots o carried by the arm A³ of the bed A, as shown in Fig. 3. The frame N carries a yoke P, provided with screws p on which the arms Q' of the graver holder Q are pivoted. This holder is provided with a yoke Q² carrying the graver Q³, with a cutting point q, as shown in Fig. 9. Projecting outward from the graver holder Q is a rod $Q^4$, to which is attached the cord $Q^5$ connected to the arm $Q^6$ of a bell crank pivoted at $q^6$ on the projection $N^6$ carried by the frame N, see Fig. 5. The arm $Q^7$ of this bell crank carries a weight $Q^8$ clamped thereon at the desired position by means of the clamp screw $q^8$, see Figs. 3 and 5. This weight pulling on the cord $Q^5$ will rock the graver holder Q about its pivots $p$ causing the graver to bear against the plate with a pressure dependent upon the position of the weight on the arm $Q^7$. This weight tends to keep the graver always in contact with the plate, unless withdrawn by the operator, as will now be described.

R represents a bell crank pivoted in bearings $A^5$, see Figs. 5 and 6, and provided with two arms $R'$ and $R^2$. The arm $R'$ is close in front of the rod $Q^4$, as shown in Figs. 3 and 5, while the arm $R^2$ is connected to a cord or wire $R^3$, which is adjustably connected as at $r^3$, see Fig. 12, to the bell crank S, pivoted as at $s$ in any suitable bed plate T, which may be secured to the floor or platform in any convenient way. The arm of this bell crank S is connected to the rod U, see Fig. 12, which is pivoted to the arm $V'$ of the lever V. For convenience of adjustment, this rod U is provided with a series of holes $u$ to engage the pin $u'$. This lever V is pivoted at $v$, and is provided with a nose $V^2$ which is normally pressed into engagement with the board $V^4$ by means of the spring $V^3$, see Fig. 12. There are two of these levers, one on each side of the frame, shown in Fig. 11, and between them extends the treadle $V^6$.

It will be seen that the rod $R'$ normally presses against the rod $Q^4$ and rocking the graver holder about its pivot $p$ will cause the graver to be kept clear of the face of the plate. Now if the treadle V be pressed down against the action of the spring $V^3$, the rod U will rock the bell crank S slacking off on the rod $R^3$ and permitting the weight $Q^8$ to pull back the arm $R'$, thus rocking the graver holder Q about its pivot $q$ in the reverse direction, and bringing the graver in engagement with the face of the plate. The graver will remain in engagement with the face of the plate as long as the treadle is pressed down; but if the treadle is released, the spring $V^3$ will again tauten the cord $R^3$ and will swing this rod $Q^4$ against the action of the weight $Q^8$, thus again withdrawing the graver from the face of the plate and restoring the parts to the initial position.

In order to limit the travel of the rod $R'$, the bell crank R is provided with a third arm $R^0$, which carries two claws $r^2$, one on either side of the stop $a^5$, as shown in Fig. 6. Thus the operator is prevented from swinging the graver holder too far backward.

The plate is secured in place in front of the graver tool as will now be described.

Referring to Figs. 1, 2 and 14 to 16, W represents a frame pivoted at $W^2$ on the arm $A^2$ of the bed A, see Fig. 15, which frame has an arm $W'$ projecting between the rods $W^3$ secured beneath the part $a^2$ of the bed. These two rods carry a link $W^4$ faced with rubber or leather $w^4$. This link $W^4$ is adjustably held on the bolts $W^3$ by means of lock nuts. It will be seen from inspecting Fig. 1, that the tendency of the frame W will be to swing in toward the graver, and that the arm $W'$ will engage the leather facing $w^4$, holding said frame normally in the position shown in Fig. 1, but yet permitting the operator to swing said frame outward about its pivot $W^2$ when he desires to adjust the plate, etc. This frame W carries a vertically adjustable frame X, which in turn carries a horizontally adjustable frame Y on which the plate is clamped, as will now be described. The frame W is slotted as at $w^0$ to receive the sliding nuts $X^0$, which have the screw stems $X'$ passing through the frame X, and carrying clamps $X^2$. The screw $W^5$ engages these nuts $X^0$ and is turned by means of the handle $W^6$. Thus it will be seen that the frame X may be moved up or down relative to the frame W. This frame X is transversely slotted as at $x^0$ to receive the nuts $Y^0$, which have screw shanks $Y'$ passing through the frame Y and engaging the clamps $Y^2$. The screw $X^5$ journaled in the carriage X carries the hand wheel $X^6$, and by turning this hand wheel the carriage Y may be moved horizontally. The carriage Y carries a fixed holder $Z^y$ fast thereto, slotted as at $y^0$ to receive the nut $Z^0$ secured by means of the shank $Z'$ and clamp $Z^2$ to the adjustable clamp Z. These clamps Z and $Z^y$ are preferably provided with a series of holes to receive suitable pins $z$ or other holders for holding the plate in place. Thus it will be seen that a plate of the desired size may be mounted on the frame Y, and that this frame may be raised or lowered or moved laterally until it is properly centered on the machine.

Having adjusted the plate in position, and set up the type on the type holder, the operator, seated on the bench $H^0$ traces the type, following the shade lines as well as the contours, and the type are reproduced on the plate on a greatly reduced scale by means of the graver. It will be seen that the tracer rod is pivoted about a horizontal axis, and also about a vertical axis, and that these two axes may be shifted along the rod independently of each other. Thus if the four gimbal points on which the tracer rod is pivoted are all in the same plane, the reproduction on the plate will be perfectly symmetrical, but on a reduced scale to the original type; but if the ring $F^5$ is moved on the sleeve F⁴ toward the tracer tool, this will shift the horizontal axis of the tracer rod, and the vertical dimensions of the type will be exaggerated, making the letters taller but not changing the breadth of the letters; while if this ring be moved toward the graver, the reproduction of the type will be made shorter vertically. It will be obvious that a similar result as to increasing or diminishing the relative width of the letters may be accomplished by moving the sleeve F in or out on the rod E, which will shift the vertical axis of the rod, causing the letters to be made fat or lean according to whether the axis is moved toward the tracer tool or away from it.

By having the graver pivoted on the horizontal swinging frame N, which is itself pivoted on the vertical swinging frame O, absolute parallelism of motion is secured, and the movements of the tracer tool at one end will be accurately reproduced on a different scale at the other end without any appreciable distortion from the center of each line toward the end. The only appreciable distortion will be that contemplated in the construction of the parts illustrated in Fig. 4, and this distortion will be uniform from one end of the plate to the other. The plate is engraved in a series of lines in reverse relation, and the plate holder is adjusted after each line is completed.

It will be seen that each letter in the line is cut under the action of a constant weight, and therefore the graver cuts to the same depth at each end of the line as it does in the center of the line, and that this action is controlled by the tracer rod. Moreover, the graver may be thrown out of action without in any way interfering with the operation of the tracer rod.

In the operation of the machine the plate is clamped in the plate holder and adjusted in the proper position relative to the graver by means of the various adjusting screws, the type or design is set up on the type holder, and the operator sitting on the bench traces the type or design, pressing on the treadle while he is tracing and thus allows the graver to cut corresponding lines upon the plate. Upon releasing the treadle the graver is withdrawn from the plate and any further motion of the tracer rod has no effect upon the plate. The operator's sole attention is required in tracing and the graver does its work at the other end automatically.

The reproduction on the plate of the type or design may be made either symmetrical or distorted in a vertical or in a horizontal plane, as may be desired, by adjusting the transverse axes about which the tracer rod rocks, as hereinafter described.

It will be obvious that various modifications might be made in the herein described apparatus, and in the construction and arrangement of parts which could be used without departing from the spirit of my invention.

Having thus described my invention, what I claim and desire to secure by Letters Patent of the United States, is:—

1. In a machine of the character described, the combination with a plate and plate holder, of a tracer rod pivoted in gimbals near one end thereof and carrying a tracer tool mounted in the opposite end, adjustable means for counterbalancing the weight of the longer arm of the tracer rod, a graver, means for pressing said graver against the plate and for withdrawing same when desired, and mechanism controlled by the movement of said tracer rod for moving said graver over the face of the plate, substantially as described.

2. In a machine of the character described, the combination with a plate and plate holder, of a tracer rod carrying a tracer telescopically mounted in one end, gimbal bearings supporting said tracer rod near the opposite end, adjustable means for counterbalancing the weight of the longer arm of the tracer rod, a graver, a weight, and mechanism operated thereby for pressing the graver against the plate with a predetermined pressure, means for withdrawing said graver from said plate against the action of said weight, and mechanism controlled by the movement of said tracer rod for moving said graver over the face of the plate, substantially as described.

3. An apparatus comprising a plate and plate holder, a type or design, and a type holder, a tracer rod mounted in universal bearings between the plate holder and the type holder and nearer the plate holder, and provided with a tracer tool, adjustable means for counterbalancing the weight of the tracer rod, a graver mounted near said plate, means for pressing said graver against said plate independent of said tracer rod, and means operated by said tracer rod for moving said graver over the face of the plate, substantially as described.

4. An apparatus comprising a plate and plate holder, a type or design, and a type holder, a tracer rod mounted in universal bearings between the plate holder and the type holder and nearer the plate holder, and provided with a tracer tool, adjustable means for counterbalancing the weight of the longer arm of the tracer rod, a graver mounted near said plate, means for pressing said graver against said plate with a predetermined pressure, and means for withdrawing said graver from the face of said plate when desired, with mechanism operated by said tracer rod for moving said graver over the face of said plate, substantially as described.

5. An apparatus comprising a plate and a plate holder, a type or design, and a type holder, a tracer rod mounted in universal bearings between the plate holder and the type holder and nearer the plate holder, and provided with a tracer tool, adjustable means for counterbalancing the weight of the longer arm of the tracer rod, a graver mounted near said plate, a weight with mechanism operated thereby pressing said graver against said plate with a predetermined pressure, independent means for moving said graver away from said plate against the action of said weight, and mechanism controlled by said tracer rod for moving said graver over the face of said plate, substantially as described.

6. In a machine of the character described, the combination with a plate and plate holder, of a tracer rod carrying a tracer tool at one end, gimbal bearings supporting said tracer rod near the opposite end, adjustable means for counterbalancing the weight of the longer arm of the tracer rod, a graver, means for holding said graver at right angles to the face of the plate while in engagement with said plate, means for pressing the graver against the plate, means for withdrawing the graver from the plate when desired, and mechanism controlled by the movement of said tracer rod for moving said graver over the face of the plate, substantially as described.

7. In a machine of the character described, the combination with a plate and plate holder, of a tracer rod pivoted in gimbals near one end thereof and carrying a tracer tool mounted in the opposite end, means for counterbalancing the weight of the tracer end of the tracer rod comprising a laterally swinging arm adapted to press upward beneath said tracer rod and to swing laterally therewith, and a spring adapted to support in whole or in part the preponderance of said arm, a graver, means for pressing said graver against the plate, and for withdrawing same when desired, and mechanism controlled by the movement of said tracer rod for moving said graver over the face of the plate, substantially as described.

8. In a machine of the character described, the combination of a plate and plate holder, of a tracer rod carrying a tracer telescopically mounted in one end, gimbal bearings supporting said tracer rod near the opposite end, means for counterbalancing the weight of the tracer end of the tracer rod comprising a laterally swinging arm adapted to press upward beneath said tracer rod and to swing laterally therewith, and a spring adapted to support in whole or in part the preponderance of said arm, a graver, a weight, and mechanism operated thereby for pressing the graver against the plate with a predetermined pressure, means for withdrawing said graver from said plate against the action of said weight, and mechanism controlled by the movement of said tracer rod for moving said graver over the face of the plate, substantially as described.

9. In a machine of the character described, the combination with a plate and plate holder, of a tracer rod carrying a tracer tool at one end, gimbal bearings supporting said tracer rod near the opposite end, means for counterbalancing the weight of the tracer end of the tracer rod comprising a laterally swinging arm adapted to press upward beneath said tracer rod and to swing laterally therewith, and a spring adapted to support in whole or in part the preponderance of said arm, a graver, means for holding said graver at right angles to the face of the plate while in engagement with said plate, means for pressing the graver against the plate, means for withdrawing the graver from the plate when desired, and mechanism controlled by the movement of said tracer rod for moving said graver over the face of the plate, substantially as described.

10. In an engraving machine, the combination with a plate holder normally held in a position inclined forward, of a pivoted bracket for said holder having a forwardly inclined shoe, and a stirrup engaging said shoe and normally holding said bracket in the upright position, but allowing the same to swing out laterally when desired, substantially as described.

11. In an engraving machine, the combination with a frame, a stirrup carried by said frame, a bracket in the form of a bell crank pivoted to said frame and having one arm inclined forward and downward and engaging said stirrup, and the other arm inclined forward and upward, whereby said bracket is held by its own weight when in the raised position, but may be swung outward and backward when desired, and a plate holder carried by said bracket, substantially as described.

12. In an engraving machine, the combination with a frame, a stirrup carried by said frame, a bracket in the form of a bell crank pivoted to said frame and having one arm inclined forward and downward and engaging said stirrup, and the other arm inclined forward and upward, whereby said bracket is held by its own weight when in the raised position, but may be swung outward and backward when desired, and a plate holder carried by said bracket, with means carried by said bracket for adjusting said plate holder in both the vertical and lateral directions, substantially as described.

13. In an engraving machine, the combination with a frame, a stirrup carried by said frame, a bracket in the form of a bell crank pivoted to said frame and having one arm inclined forward and downward and engaging said stirrup, and the other arm inclined forward and upward, whereby said bracket is held by its own weight when in the raised position, but may be swung outward and backward when desired, and a plate holder carried by said bracket, with a system of blocks and nuts and screws carried by said bracket for adjusting said plate holder in both the vertical and lateral directions, substantially as described.

14. In an engraving machine, the combination with a frame, a stirrup carried by said frame, a bracket in the form of a bell crank pivoted to said frame and having one arm inclined forward and downward and engaging said stirrup, and the other arm inclined forward and upward, whereby said bracket is held by its own weight when in the raised position, but may be swung outward and backward when desired, and a plate holder carried by said bracket, with a system of blocks and nuts and screws carried by said bracket for adjusting said plate holder in both the vertical and lateral directions with a plate detachably connected to said plate holder, and means for engraving on said plate, substantially as described.

In testimony whereof, I affix my signature, in presence of two witnesses.

ROBERT H. KIRK.

Witnesses:
M. MILLARD,
H. M. FLETCHER.